US008336594B2

(12) United States Patent
Winter

(10) Patent No.: US 8,336,594 B2
(45) Date of Patent: Dec. 25, 2012

(54) LABELING UNIT

(75) Inventor: Horst Winter, Neutraubling (DE)

(73) Assignee: Krones AG, Neutraubling (DE)

( * ) Notice: Subject to any disclaimer, the term of this patent is extended or adjusted under 35 U.S.C. 154(b) by 385 days.

(21) Appl. No.: 11/965,985

(22) Filed: Dec. 28, 2007

(65) Prior Publication Data

US 2008/0155942 A1 Jul. 3, 2008

(30) Foreign Application Priority Data

Dec. 29, 2006 (DE) ......................... 10 2006 062 511

(51) Int. Cl.

| | |
|---|---|
| ***B32B 37/10*** | (2006.01) |
| ***B32B 37/16*** | (2006.01) |
| ***B65C 9/42*** | (2006.01) |
| ***B65C 9/44*** | (2006.01) |
| *G05G 15/00* | (2006.01) |
| *B65C 9/40* | (2006.01) |

(52) U.S. Cl. ........ 156/363; 156/350; 156/361; 156/362; 156/538

(58) Field of Classification Search .................. 156/350, 156/361, 362, 363, 538

See application file for complete search history.

(56) References Cited

U.S. PATENT DOCUMENTS

| | | | | |
|---|---|---|---|---|
| 3,767,515 | A | 10/1973 | Eder | |
| 3,954,542 | A * | 5/1976 | Solomon et al. | 156/360 |
| 4,321,103 | A * | 3/1982 | Lindstrom et al. | 156/351 |
| 4,430,141 | A * | 2/1984 | Zodrow | 156/360 |
| 4,445,961 | A * | 5/1984 | Kronseder et al. | 156/364 |
| 4,589,949 | A | 5/1986 | Cavagnino et al. | |
| 4,647,333 | A * | 3/1987 | Voltmer et al. | 156/351 |
| 4,726,865 | A * | 2/1988 | Treat | 156/249 |
| 5,039,374 | A * | 8/1991 | Winter | 156/504 |
| 5,116,452 | A * | 5/1992 | Eder | 156/566 |
| 5,587,043 | A * | 12/1996 | Hying et al. | 156/566 |
| 5,787,598 | A | 8/1998 | Tillis, Sr. et al. | |
| 7,343,953 | B2 * | 3/2008 | Smith | 156/566 |

FOREIGN PATENT DOCUMENTS

| | | |
|---|---|---|
| CA | 2391556 | 12/2003 |
| DE | 2116912 | 10/1972 |
| DE | 2435540 | 2/1976 |
| DE | 2435582 | 2/1976 |

(Continued)

OTHER PUBLICATIONS

English translation of DE3404368A1 by Winter, Horst; Aug. 1985.*

(Continued)

*Primary Examiner* — Sonya Mazumdar

(74) *Attorney, Agent, or Firm* — Marshall, Gerstein & Borun LLP

(57) ABSTRACT

A labeling unit having a label holder for at least one first size or format of label, at least one transfer-plate shaft which is at least drivable in rotation and which carries at least one transfer plate for the first size or format of label, a gripper cylinder at least able to be driven in rotation which carries controlled grippers set at least to the first size or format of label, and having pressure-applying members on the gripper cylinder which are associated with the grippers. The label holder, the transfer plate and the gripper cylinder are three main subassemblies of the labeling unit which define a transfer path for labels, which co-operate with one another at positions for co-operation and which can be converted for a change of size or format.

4 Claims, 6 Drawing Sheets

FOREIGN PATENT DOCUMENTS

| | | | | |
|---|---|---|---|---|
| DE | 7619659 | | | 3/1977 |
| DE | 2719216 | | | 11/1978 |
| DE | 3404368 | A1 | * | 8/1985 |
| DE | 3722220 | A1 | * | 1/1989 |
| DE | 29705251 | | | 2/1998 |
| DE | 19741476 | | | 3/1999 |
| DE | 19741476 | A1 | * | 3/1999 |
| DE | 29904552 | | | 2/2000 |
| DE | 19845964 | | | 6/2000 |
| EP | 1 314 648 | A1 | | 5/2003 |
| EP | 1314648 | | | 5/2003 |
| EP | 1 561 690 | A1 | | 8/2005 |
| EP | 1 561 690 | A1 | | 8/2005 |
| JP | 03152047 | | * | 6/1991 |
| JP | 2006160282 | | | 6/2006 |
| JP | 2006160282 | A | * | 6/2006 |
| WO | WO 9957018 | A1 | * | 11/1999 |

OTHER PUBLICATIONS

English translation of DE3722220A1 by Winter, Horst; Jan. 1989.*
English translation of DE3722220, Horst, Winter. Jan. 1989.*
European Search Report for EP 07021070 dated Apr. 14, 2008.
European Office Action for EP 07021070 dated Sep. 9, 2009.

* cited by examiner

LABELING UNIT

FIELD OF DISCLOSURE

The present application claims the benefit of priority of German Patent Application No. 10 2006 062511.0, filed Dec. 29, 2006. The entire text of the priority application is incorporated herein by reference in its entirety.

The disclosure relates to a labeling unit for container, such as used in beverage bottling operations.

BACKGROUND

The printed document entitled “Kleines abc der Etikettentechnik für Bedienungsleute” [“A little ABC of labeling for operators”], issued by Messrs KRONES AG, Hermnann Kronseder, Maschinenfabrik, 93068 Neutraubling, DE, and numbered 2500d.03/89, and the assignee of the present application, explains, from page 7 on, that, when there is a change in the size or format of label, the transfer plates, the label holders and the gripper cylinder have to be exchanged or added to. The work which has to be done for this purpose is time-consuming and means relatively long downtimes for the labeling unit. Also, a considerable amount of money has to be spent on stock-holdings and logistics, because there are a large number of size or formats of label and correspondingly large numbers of individual parts have to be kept available in such a way that they can be found at any time.

In labeling units which are known from DE 7619659 U and DE 198 45 964 A, a pair of identical transfer plates are arranged on the transfer-plate shaft in a mirror-image arrangement relative to the axis of the transfer-plate shaft, in order to achieve a high cycle speed for a relative slow movement on the part of the transfer plates. For a change of size or format, the transfer-plate shaft carrying the transfer plates has to be changed.

In the labeling machine known from U.S. Pat. No. 4,589,949 A, two identical transfer plates are likewise arranged on the transfer-plate shaft. If there is a change of size or format, the transfer-plate shaft plus the transfer plates has to be changed.

In the labeling unit known from DE 197 41 476 A, a plurality of transfer-plate shafts each having one transfer plate are arranged on a transfer-plate carousel. For a change of size or format, the transfer plates are replaced by transfer plates matched to the new size or format of label.

Known from DE 21 16 912 is an automatic loading system for the label holder of a labeling unit. A plurality of filled re-supply magazines are held ready in a compartmented wheel able to be driven in rotation and are lined up in succession with the label holder before a pusher feeds the re-supply labels forward. The automatic loading system makes it possible for the labeling unit to operate uninterruptedly.

Another automatic label loading system is known from EP 1 314 648 B. Magazines filled with re-supply labels of the same size or format are lined up, one at a time, on a paternoster lift (also known as a “cyclic elevator”), with the label holder, which is able to be used for only one size or format of label and which is held in a fixed position in the labeling unit.

SUMMARY OF DISCLOSURE

The object underlying the disclosure is to provide a labeling unit of the kind specified in the opening paragraph which, when there is a change of size or format, makes possible a conversion time of optimum shortness and if required can be operated with the widest possible degree of automation.

Because at least one of the three main sub-assemblies responsible for label transfer is subjected, manually or by motorized means, to a change in its position for co-operation in view of the new size or format of label while remaining in the labeling unit, no removal or replacement work, or no costly and extensive removal or replacement work, is required for the change of size or format. The conversion time is of optimum shortness. The labeling unit can be converted with the widest possible degree of automation, particularly when there is a change in the co-operating position in the labeling unit which is effected by motorized means. In addition to the advantage of a short conversion time, the result is also a smaller amount of space required for stock holdings, and considerably fewer exchangeable parts are required. It is useful for at least one main sub-assembly to be convertible in this way, the conversion of which by replacement is normally very time-consuming and complicated. It is however possible for two or even all three of the main sub-assemblies to be designed for conversion in the labeling unit. What is particularly useful is for all three main sub-assemblies to be convertible by changes in the position for co-operation on at least components which transfer labels.

In a useful embodiment, label holders for labels of different size or formats are arranged in a position-changer, such for example as a turret magazine or a paternoster lift, in such a way that each label holder can be moved selectively to a position for co-operation with the transfer plates. This changeover can conveniently be performed manually, and with particular convenience is controlled by motorized means. For the change of size or format, this does away with the removal or replacement of the label holder which is no longer required in the given case.

In another useful embodiment, transfer plates for different sizes or formats of label are arranged together on the transfer-plate shaft. As in the usual way, a plurality of transfer-plate shafts may be provided in a transfer-plate carousel. The transfer plates for the different sizes of label are usefully offset from one another in the circumferential direction of the transfer-plate shaft. Two, three or more transfer plates may be present. For the change of size or format, the transfer-plate shaft may be selectively re-inserted manually, or selectively changed over by motorized means, among a plurality of positions for co-operation between a respective one of the transfer plates and the label holder which is situated in its position for co-operation, and also between it and the grippers on the gripper cylinder, in order to bring the transfer plate which is required in the given case to the predetermined position for co-operation. If labels are transferred at a plurality of levels, transfer plates corresponding to a plurality of different size or format of label are of course provided at each level on the transfer-plate shaft.

In another useful embodiment, for the change of size or format the given gripper on the gripper cylinder can be set to different positions for co-operation with the given transfer plate, and usefully also to different positions for co-operation with the container to be labeled. The gripper is changed over either manually or by motorized means, and this is done without any components of any significance of the labeling unit or the gripper cylinder having to be removed. It is particularly useful for the changeover even to be performed by automation or under remote control.

According to another important aspect, the gripper has a positioning drive for timing it in relation to the position for co-operation with the transfer plate. The positioning drive may be actuated mechanically or by means of a positioning motor, this being done to enable the timing of the gripper to be adjusted to the new size or format of label.

To have the widest possible range of setting facilities, it may be useful for the gripper to be arranged to be adjustable substantially parallel and/or substantially perpendicularly to the axis of the gripper cylinder. Adjustment of the gripper may for example be effected by means of an electrically adjustable spindle, or by hand by turning a spindle of this kind.

In another useful embodiment, the gripper may be arranged on a gripper shaft which is adjustable on the gripper cylinder by means of a positioning drive. By this means, various sizes of label can be processed with a single gripper cylinder.

In accordance with a further, particularly important feature, the gripper even has an electrical or electromagnetic gripper-actuating drive, which means that the usual cam discs plus followers are dispensed with and changeovers of the gripper operation can be made with particular convenience by remote control, by using stored programs or tables for example.

Because the pressure-applying element too requires certain settings as a function of the size or format of label if a change of size or format takes place, it is useful for there to be provided, for a sponge on the gripper cylinder which is arranged as a pressure-applying member on a sponge pusher, a positioning drive, preferably of an electrical or electromagnetic nature, which makes such adjustments or changes in the position for co-operation of the pressure-applying element possible conveniently and without any significant parts of the labeling unit being removed.

The capacity of the labeling unit to be versatile can be made use of in the optimum way if the label holder which is set to the position for co-operation with the transfer plate has connected upstream of it an automatic magazine loading system. When labeling is taking place then, provided it is one size or format of label which is being processed on a single labeling level or on each one of labeling levels, no breaks in operation are required, because sufficient labels of the size or format being processed are re-supplied each time to the label holder by means of the magazine loading system.

In a useful, very largely automated embodiment of the labeling unit, the electrical or electromagnetic positioning or actuating drives at least for changing the positions for co-operation on the at least one sub-assembly are connected to a central electronic control device which is preferably programmable. In this way, for a change of size or format, all the settings can be made from a central point, by means of a screen or an input section for example, without the need for any direct action to be taken in the labeling unit.

BRIEF DESCRIPTION OF THE DRAWINGS

Embodiments of the item to which the disclosure relates will be explained by reference to the drawings. In the drawings.

DETAILED DESCRIPTION

Figure 1:
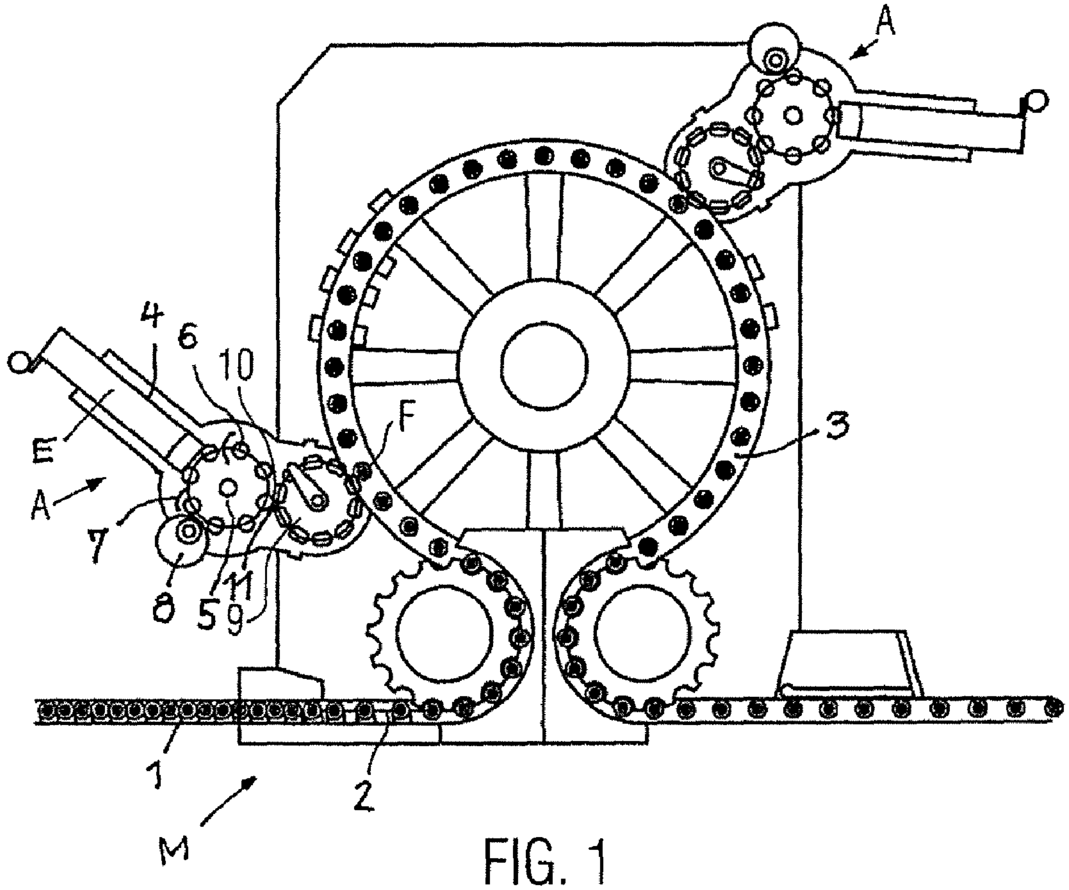
FIG. 1 is a schematic plan view of a labeling machine having a plurality of labeling units.

FIG. 1 is a schematic view of the construction of a labeling machine M for labeling bottles F. Bottles F coming from a linear supply feeder 1 are separated into singletons by a distributor screw 2 and are transferred to a rotating bottle turntable 3. Associated with the path for circulation followed by the bottle turntable 3 are, in this embodiment, two labeling units A. That labeling unit A which is the first in the direction of circulation of the bottles F is used for example for foil wrapping and for front and neck labeling, while the second labeling unit may be provided for rear labeling. Only one labeling level is shown at each labeling unit A, even though a plurality of labeling levels, situated one above the other, may be provided if required, e.g. three in the case of the first unit.

The labels E to be transferred for labeling are held ready in a label holder 4 which is lined up with a transfer-plate shaft carousel 5 on which a plurality of transfer-plate shafts 6 are mounted in such a way as to be drivable in rotation in upright positions and positions away from its axis of rotation. Each transfer-plate shaft 6 carries at least one transfer plate 7, i.e. (see FIGS. 2 and 3) at least two transfer plates 7*a*, 7*b* or 7*c* in each case for different sizes of label. Associated with the transfer-plate shaft carousel 5 is a glueing roller 8 and a gripper cylinder 9 having pressure-applying members 10 and grippers 11 arranged thereon.

When the transfer-plate shaft carousel 5 rotates and the transfer-plate shafts 6 move in rotation, each transfer plate 7 is coated with glue on its adhesive surface as its passes the glueing roller 8 and is then rolled over the foremost label E in the label holder 4, when it takes the label with it, the label then being transferred on, with its rear face resting flat against the adhesive surface of the transfer plate 7, to a gripper 11, which takes hold of the label by its edge which is leading in the direction of transport, detaches it from the transfer plate 7 and transfers it to the bottle F. The bottle F is fed past the gripper cylinder 9 by the turntable 3, the gripper 11 holding the label E firmly when the glued side is applied to the bottle F until the pressure-applying member 10 presses the label against the circumference of the bottle. Along the path of movement in the bottle turntable, the labels can still be post-treated in the usual way with brushes, sponge rollers, or the like.

The label holder 4, each transfer-plate shaft 6 having at least two transfer plates 7, and the gripper cylinder having the grippers 11 are three main sub-assemblies of the labeling unit which co-operate with one another and define a label transfer path. These main sub-assemblies co-operate in respective positions for co-operation, what is important in the course of operations being for these positions for co-operation, which depend on the size or format of the labels, to be precisely observed.

In accordance with the disclosure, changes of position for co-operation are possible by manual or motorized action at least one of the three main sub-assemblies in the labeling unit A, i.e. changes in the position for co-operation for at least components of the sub-assembly which come into contact with the labels E.

Figure 2:
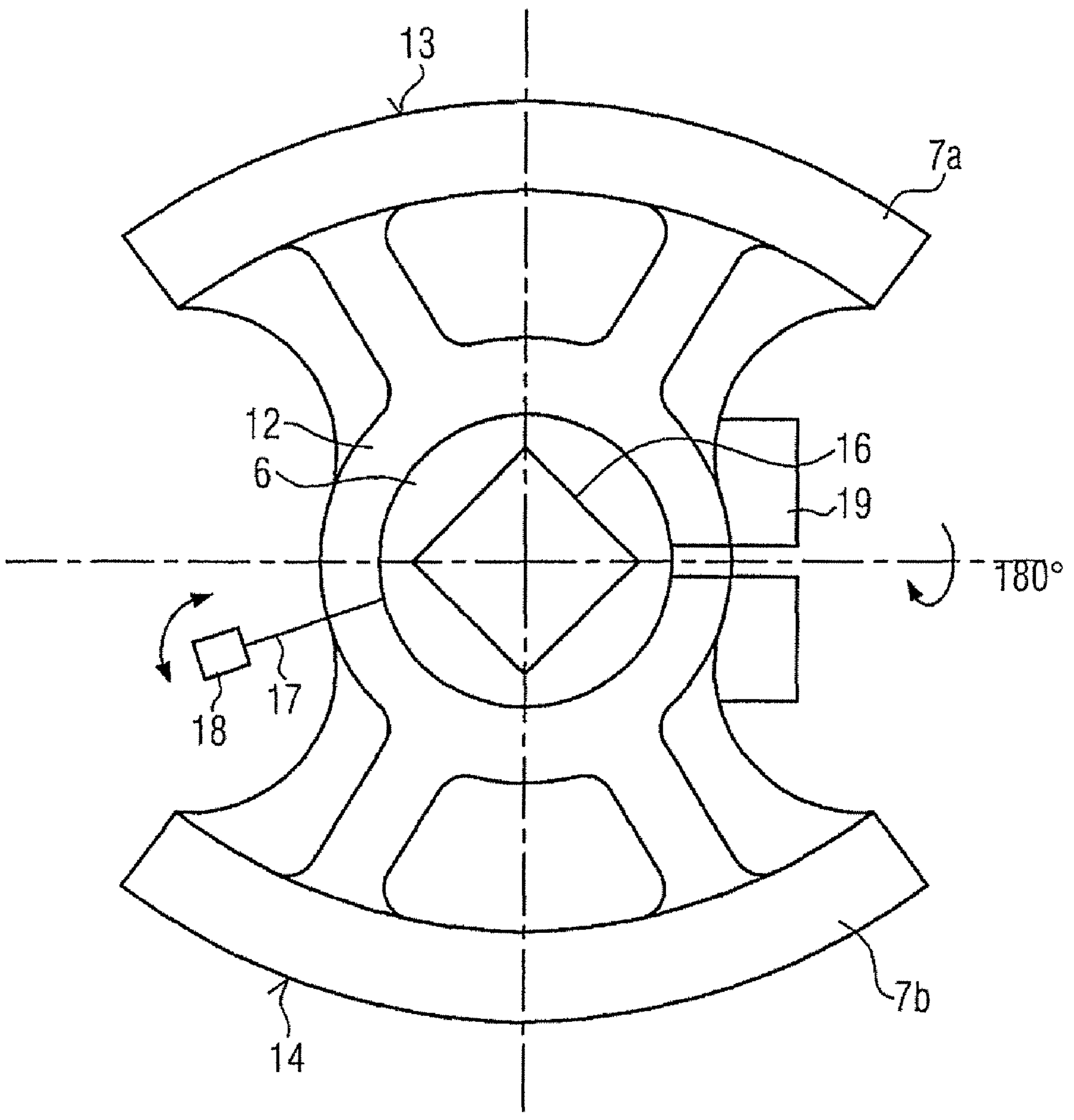
FIG. 2 shows a transfer-plate shaft having two transfer plates for different sizes of label.

As shown in FIG. 2, there are arranged on one and the same transfer-plate shaft 6, on a hub 12 which can be locked in place by means of a clamping block 19, two transfer plates 7*a*, 7*b* which are offset from one another circumferentially around the axis of the transfer-plate shaft by 180° in the present case. Each transfer plate 7*a*, 7*b* is designed to transfer a given size or format of label, with the two sizes of label being different from one another, i.e. the adhesive faces 13, 14 of the two transfer plates 7*a*, 7*b* are of different sizes and/or outline shapes.

Indicated in FIG. 2 are two different possible ways of changing the position for co-operation. To allow the position for co-operation to be changed manually, the transfer-plate shaft 6 has a polygonal projection 16, which is a square for example in the present case, to allow the transfer-plate shaft to be set to operate with one or other transfer plate 7*a*, 7*b* after being withdrawn, turned through 180° and re-inserted. A second possible way is afforded by providing an electrical or electric-motor-operated positioning drive 18, having a drive connection 17, between the transfer-plate shaft carousel (not shown) and the transfer-plate shaft 6, to turn the transfer-plate shaft 6 through 180° relative to the transfer-plate carousel to or from the position for co-operation or standby position intended for whichever transfer plate 7*a* or 7*b* is required in the given case, usefully by remote control.

Figure 3:
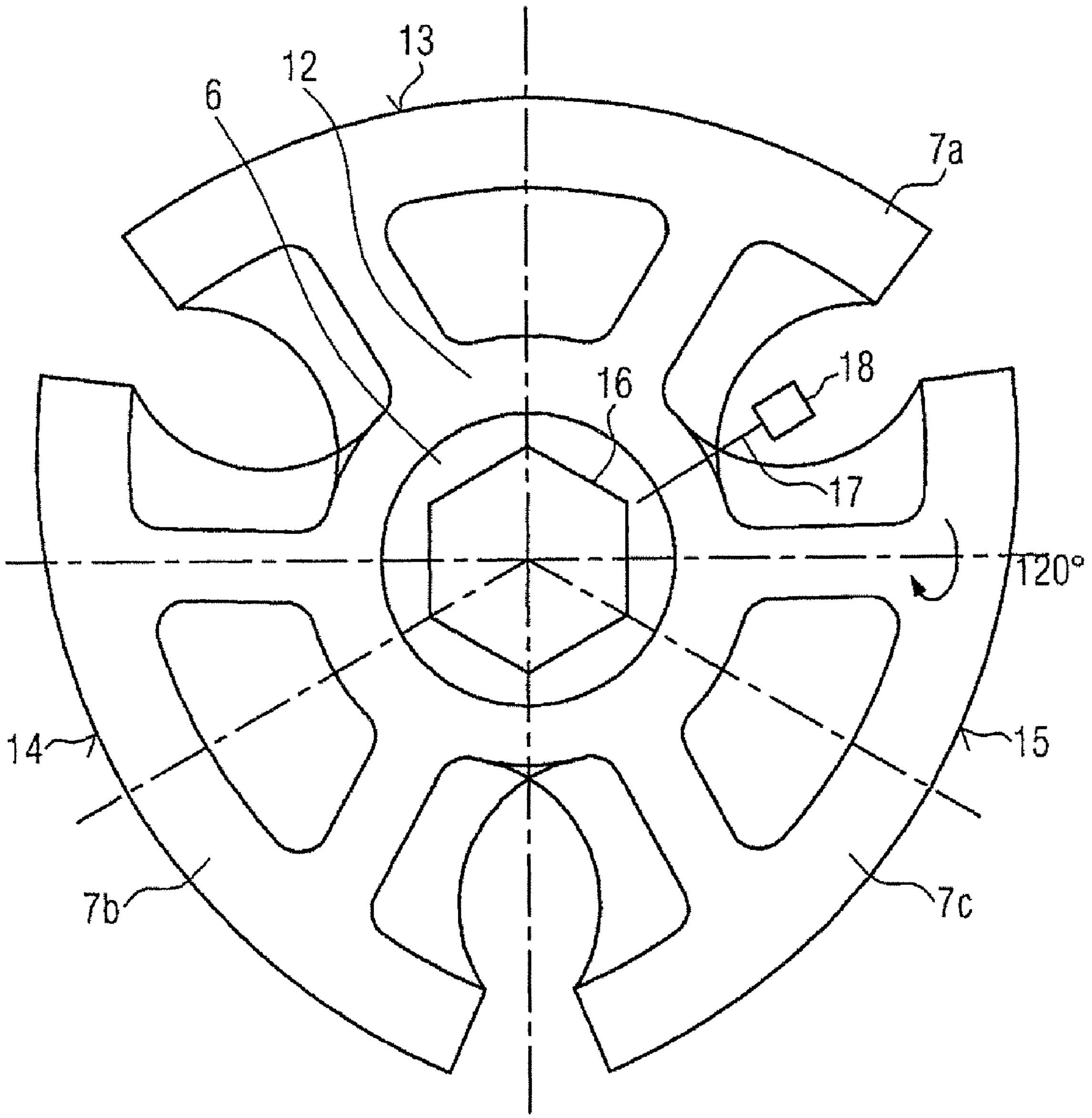
FIG. 3 is a plan view of a transfer-plate shaft having transfer plates associated with three different sizes of label.

In FIG. 3, there are even arranged on the transfer-plate shaft 6, e.g. on a hub 12, three transfer plates 7*a*, 7*b* and 7*c*, each for one size or format of label and having adhesive surfaces 13, 14, 15, which transfer plates 7*a*, 7*b*, and 7*c* are offset at 120° to one another around the axis of the transfer-plate shaft. As a polygonal projection 16, the transfer-plate shaft 6 has for example a hexagon and can be withdrawn manually to be turned through 120° and re-inserted in order, each time this is done, to set a desired transfer plate 7*a*, 7*b* or 7*c* to a new position for co-operation with the label holder 4. As a second alternative, the positioning drive 18 having the drive connection 17 may be provided to turn the transfer-plate shaft 6 relative to the transfer plate-shaft carousel under remote control.

As a further possible adjustment within the labeling unit A, the hub 12 may also be adjusted if required on the transfer-plate shaft 6 in the axial direction to make a change in the position for co-operation in the heightwise direction, this being done either manually of by means of a remotely-controlled positioning drive (not shown).

Figure 4:
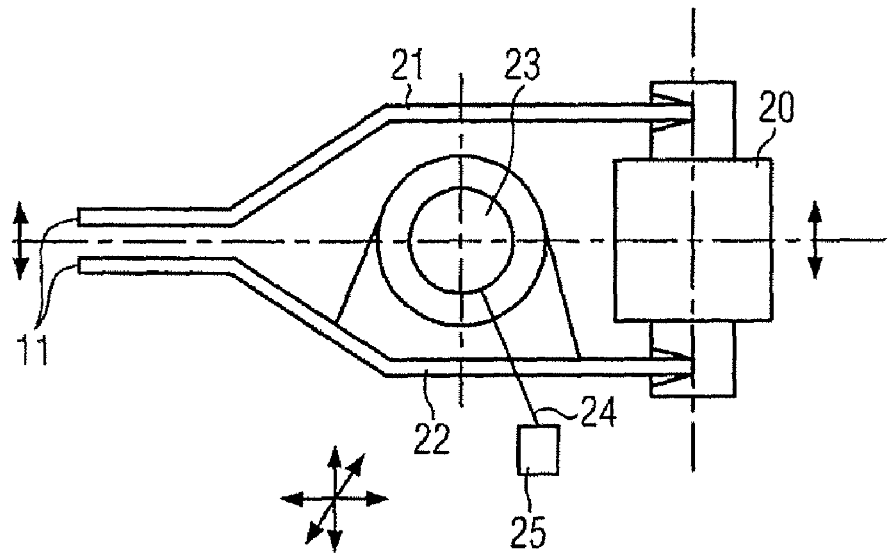
FIG. 4 is a plan view of a gripper.

FIG. 4 is a plan view of a schematically indicated gripper 11 for taking over the glued label from the given transfer plate. The gripper 11 is mounted by gripper arms 21, 22 on a gripper shaft 23 on the gripper cylinder 9 (not shown) and has for example between the free ends of the gripper arms 21, 22 an electrical or electromagnetic positioning drive 20, e.g. a solenoid. The positioning drive 20 may be so designed that not only does it make possible an adjustment of the position for co-operation of the gripper 11 relative to the transfer plate but could at the same time also be, for the gripper 11, the actuating drive to actuate the gripper arms 21, 22 with a selectable timing and, if required, a selectable travel relative to the rotary movement of the gripper cylinder 9. By means of a screw-threaded spindle for example, the gripper 11 could be adjustable in the axial direction on the gripper shaft 23 by means of a positioning drive 25 and a driving connection 24 for example. A further possible way of adjustment (not shown) may be afforded by causing the gripper shaft 23 to be adjustable substantially radially and/or in the circumferential direction relative to the gripper cylinder 9, this being done manually or by motorized means. Even though the gripper 11 is shown with two pivotable gripper arms 21, 22 in FIG. 4, the gripper 11 could equally well have only one gripper arm which was movable relative to a stationary, and usefully settable, abutment edge.

Figure 5:
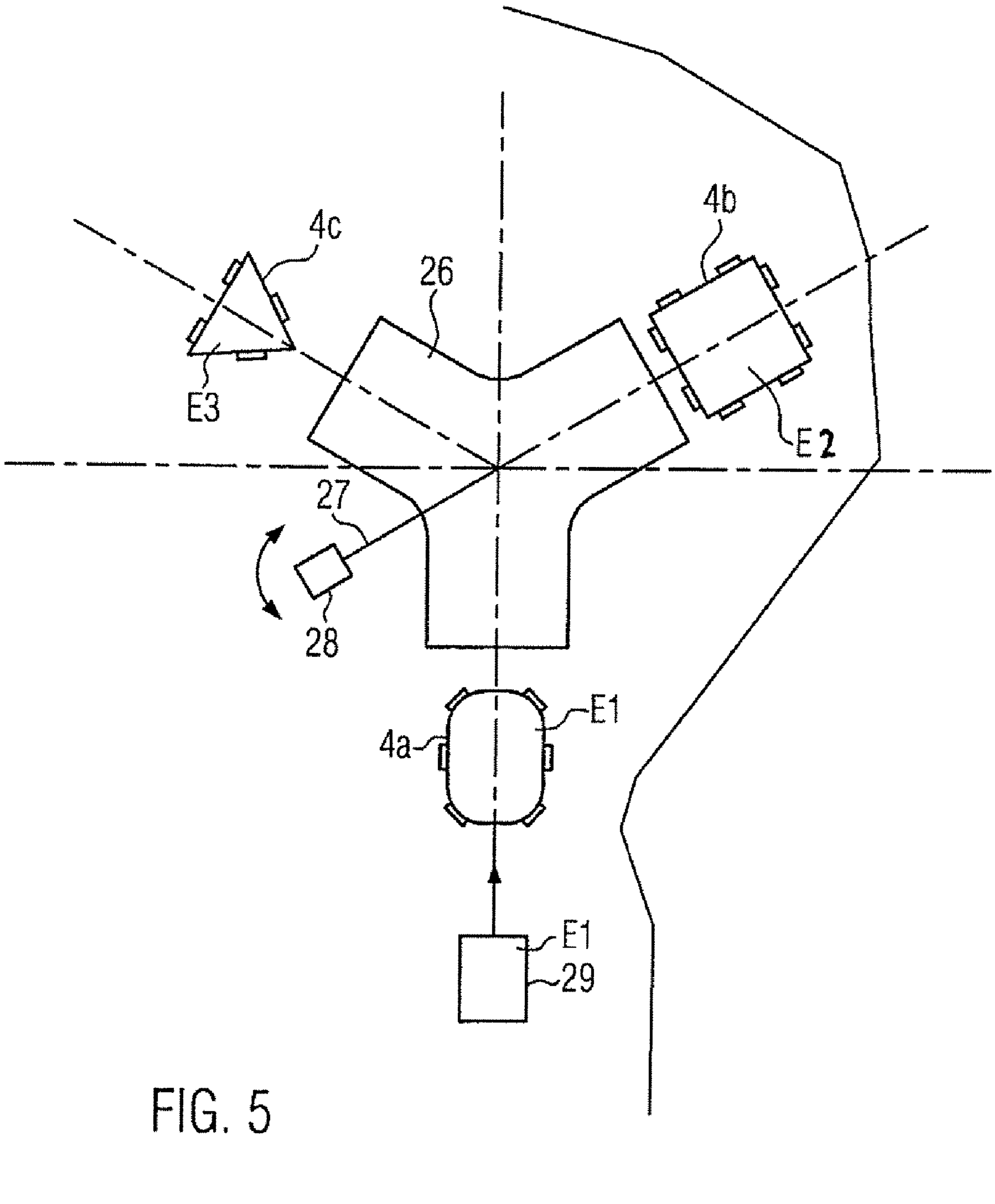
FIG. 5 is a schematic view of a label-holder changer.

FIG. 5 shows a label-holder changer 26 which takes the form for example of a turret magazine or paternoster lift and on which are mounted, offset from one another at 120° for example, three different label holders 4*a*, 4*b*, 4*c*, each for one size or format of label E1, E2, E3. The label holder 4*a* for example has just been set to its position for co-operation with the transfer plates to process the E1 size or format labels, while the other label holders 4*b*, 4*c* for the other sizes or formats of label E2, E3 are in the standby or waiting position. The changer 26 can be adjusted by means of a positioning drive 28 and a drive connection 27 in steps of 120°, to bring the label holder which is required at the time to the position for co-operation.

Also, it is indicated in FIG. 5 that the label holder 4*a* which is active at the time, for the E1 size or format labels, has associated with it an automatic loading system 29 by which the A1 size or format labels are fed in as an ongoing process.

Figure 6:
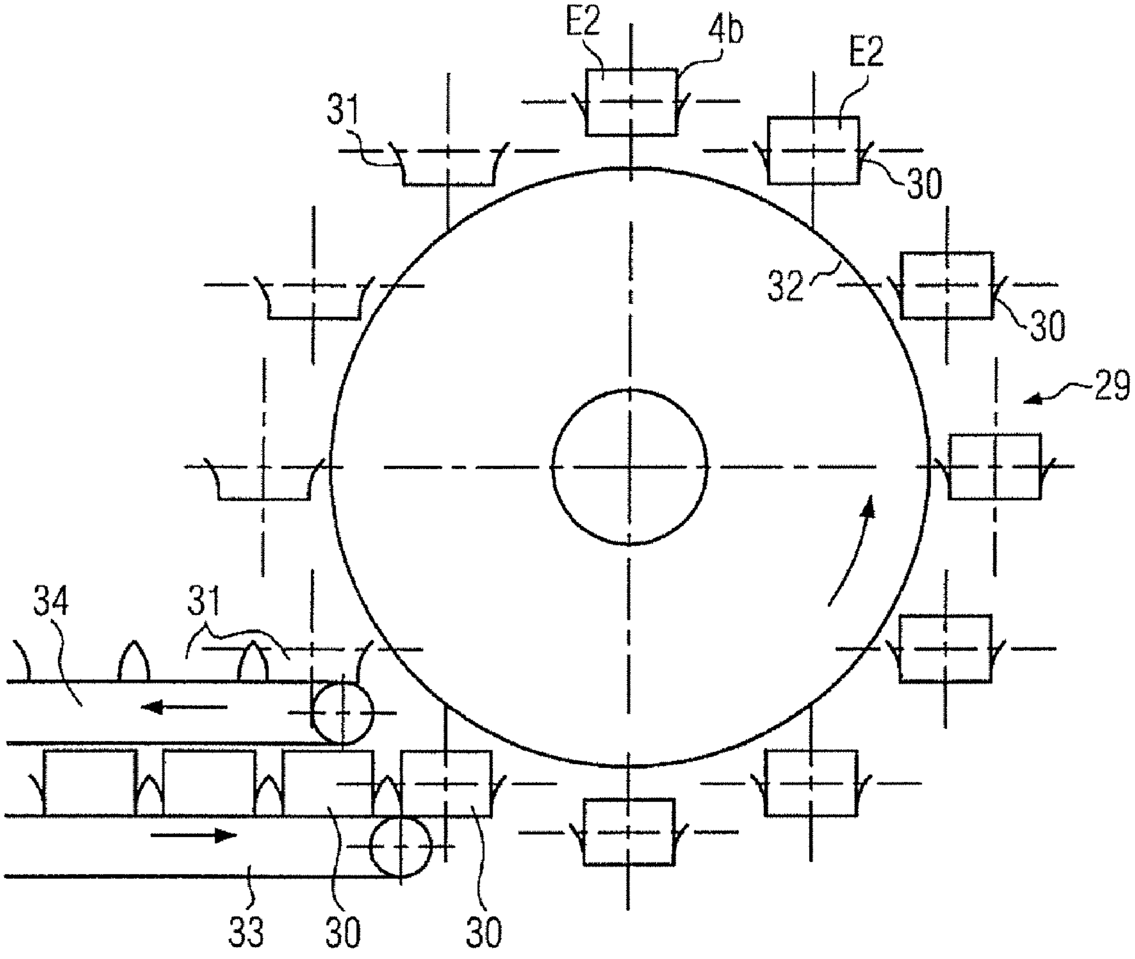
FIG. 6 is a schematic view of an automatic loading system associated with a label holder.
Figure 7:
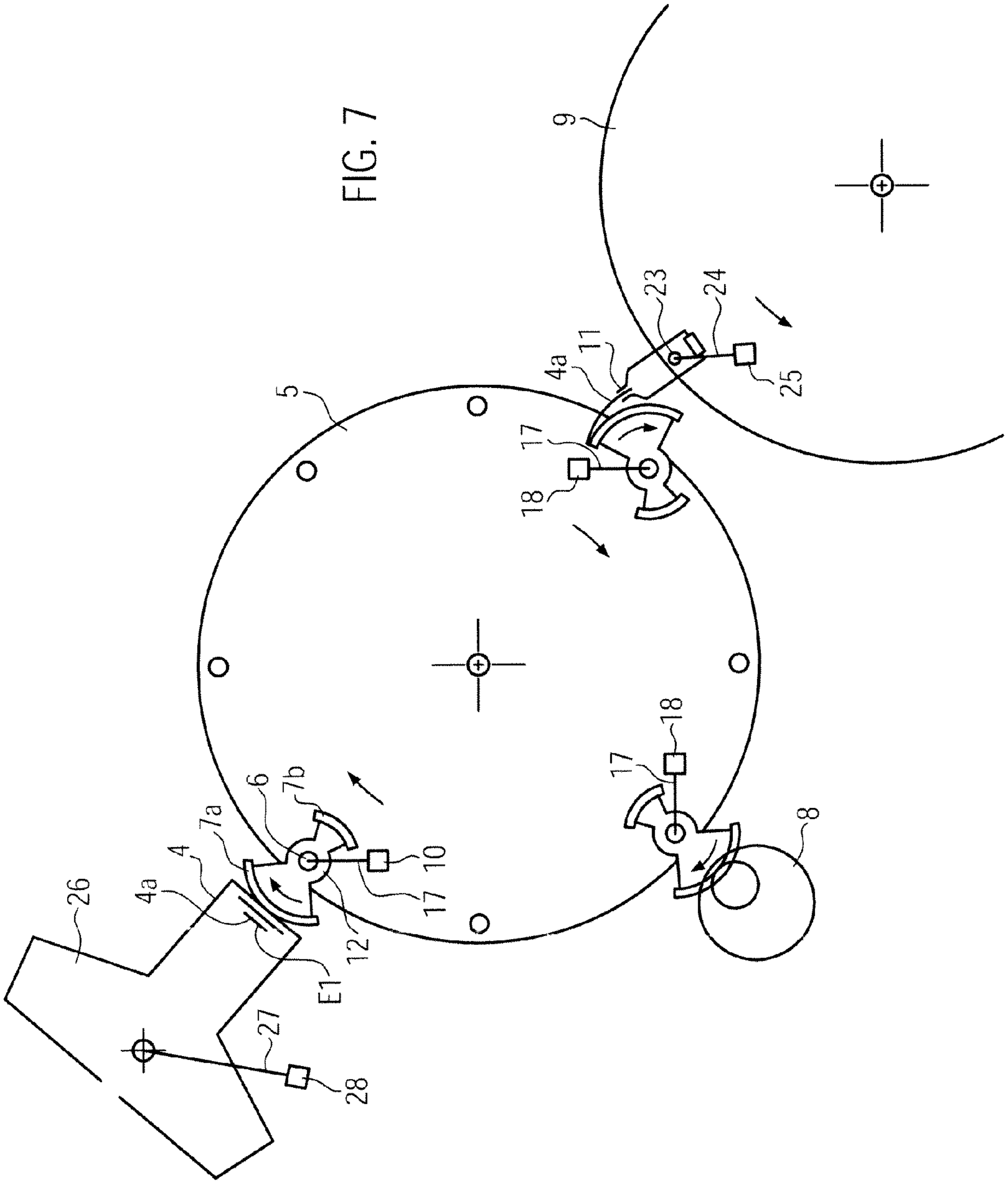
FIG. 7 depicts the label holder feeding labels to the gripping cylinders, and where the position-changers are situated within the labeling unit.

FIG. 6 is a schematic view which makes clear the interaction between an illustrative embodiment of the automatic loading system 29 and the label holder 4*b* for the E2 size or format labels. The label holder 4*b* is in its position for co-operation with the transfer plates and is shown as the very top of FIG. 6. Supplied in succession in an anti-clockwise direction on a paternoster lift 32 are magazines 30 filled with E2 size or format labels, which are fed in by a supplying belt conveyor 33 and are passed over in succession to the paternoster lift 32. Empty magazines 31 are fed away on the paternoster lift 32 and passed to a takeaway belt conveyor 34. When there is a change of size or format, to for example the label holder 4*a* for the E1 size or format labels, as shown in FIG. 5, magazines of an appropriate form for the E1 size or format labels are fed in and fed away in place of the magazines 30, 31 for the E2 size or format labels.

The labeling machine M or each labeling unit A may be operated from a central control device in order, in the event of the prescribed changes in position for co-operation which are produced by motorized means, to move the respective positioning or actuating drives. This may for example be done by remote control with the help of a screen and an input section using programmed settings, which means that no significant manual intervention is required in the labeling unit. It is however also possible for simple type-change switches or similar elements to be provided. It is possible for the conversion time to be shortened even if only one of the three main sub-assemblies can be changed over within the labeling unit. However, with a view to the widest possible automation, it is useful for all three main sub-assemblies to be adjusted as appropriate by motorized means. With regard to the label holders and the transfer plates, provision is made in accordance with the disclosure for more than one of each to be fitted, and changes of position for co-operation are made either manually (in a simple embodiment) or by motorized means. With regard to the grippers, structural provisions are made to allow the timing and the position for co-operation of each gripper to be adjusted individually either manually or even by motorized means.

Because even the pressure-applying elements 10 have an important role to play in labeling and are usually formed by sponges on sponge pushers, it is useful for a manual or motorized changeover facility for a change of size or format to be provided at the pressure-applying members too.

The invention claimed is:

1. Labeling unit for labeling containers and in particular bottles, with pre-cut labels, comprising at least one label holder matched to the sizes or formats of the labels, at least one transfer-plate shaft which is at least drivable in rotation and which carries at least one transfer plate matched to the sizes or formats of the labels, a gripper cylinder able to be driven in rotation which carries grippers in settings on the gripper cylinder matched to the sizes or formats of the labels, the label holder, the transfer plate and the gripper cylinder being three main sub-assemblies of the labeling unit which define a transfer path for labels, and which co-operate with one another in respective positions, wherein for a change of size or format of the labels at least one of three main sub-assemblies can be converted by a change in position of components of the at least one of the three main sub-assemblies while remaining in the labeling unit either manually or by motorized means of the respective components of the main sub-assembly from one position for co-operation within the labeling unit, the position for co-operation corresponding to one size or format of the labels, into at least one further position for co-operation within the labeling unit, the further position for co-operation corresponding to another size or format of the labels, wherein in one main sub-assembly of the three main sub-assemblies, two, three, or more transfer plates for different sizes or formats of labels are arranged together on the at least one transfer-plate shaft offset from each other circumferentially around an axis of the at least one transfer-plate shaft, each transfer plate of the two, three or more transfer plates arranged on the respective at least one transfer-plate shaft being of dimensions distinct from at least one of the other transfer plates, such that each distinctly-dimensioned transfer plate is sized to transfer a distinct size or format of labels, and wherein for a change of size or format of the labels processed by the labeling unit when labeling containers with labels of a different size or format the transfer-plate shaft is turned in circumferential direction around the axis of the transfer-plate shaft to or from a position for co-operation and a standby position of a respective transfer plate of the two, three or more transfer plates by one of selectively manually or by motorized means among a plurality of positions for the respective label transfer co-operation between a respective one of the transfer plates turned in the position for co-operation between a respective one of the transfer plates turned in the position for co-operation and at least a label holder which is also situated in its position for co-operation.

2. Labeling unit according to claim 1, wherein in a second main sub-assembly of the three main sub-assemblies label holders for a first size or format of label and at least one further size or format of label are arranged in a position-changer, and wherein for a change in size or format of the labels each of the label holders arranged in the position-changer can be moved selectively to a position for co-operation with a respective two, three or more transfer plates on the at least one transfer-plate shaft of the one main sub-assembly of the three main sub-assemblies, which transfer plate has been turned with the transfer-plate shaft into the position for co-operation with a label holder, and wherein the position-changer of the label holders is one of a turret magazine and a paternoster lift.

3. Labeling unit according to claim 1, wherein in a second main subassembly of the three main sub-assemblies, the second main sub-assembly having the gripper cylinder carrying the gripper, each of the grippers being arranged on a gripper shaft on respective gripper cylinders such that for a change in size or format of the labels the respective gripper can be selectively set on the gripper shaft in the axial direction of the gripper shaft by at least one position drive comprising at least one electrically or electromagnetically adjustable threaded spindle for adjusting the gripper in the axial direction of the gripper shaft to different positions for co-operation with the at least one of the two, three or more transfer plates, which transfer plate has been turned with the transfer-plate shaft into the position for co-operation with the respective gripper finger.

4. Labeling unit according to claim 1, wherein the at least one motorized means for changing the position of a component of a respective main sub-assembly of the three main sub-assemblies comprises for a change of size or format of the labels an electrical or electromagnetic positioning drive connected to a central electronic control device, and wherein the position of the component is remotely settable with the help of a screen and an input section of the central electronic control device.

* * * * *